Patented Oct. 5, 1937

2,094,933

UNITED STATES PATENT OFFICE 2,094,933

DERIVATIVES OF HALOGEN CONTAINING RUBBER BODIES

Herbert A. Winkelmann, Chicago, Ill., assignor to Marbon Corporation, Chicago, Ill., a corporation of Delaware No Drawing. Application May 10, 1935,
Serial No. 20,895

15 Claims. (Cl. 260—1)

This invention relates to derivatives of halogen containing rubber bodies. More particularly, it relates to the reaction products of a chlorine containing rubber derivative and an alcohol. In one form the invention relates to the reaction product of asymmetrical rubber hydrochloride and glycerine.

Hydrogen halides, including hydrogen chloride, hydrogen bromide and hydrogen iodide, may react additively to the rubber molecule to form either amorphous asymmetrical compounds or crystalline symmetrical compounds whose respective physical properties vary greatly. It is believed that the crystalline symmetrical hydrochloride compound has the following nuclear formula:

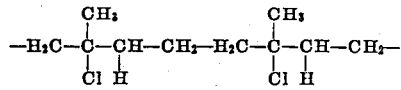

and that the amorphous asymmetrical rubber hydrochloride compound is as follows:

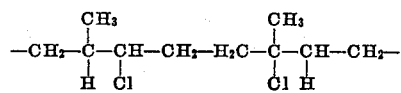

The amorphous reaction product of rubber and hydrogen chloride is preferably made by the method described in Gebauer-Fuelnegg Patent No. 1,980,396. It has been found that this amorphous asymmetrical product is produced by the action of hydrogen halides on undissolved butadiene bodies at low temperatures. It is preferably produced by allowing liquefied hydrogen chloride at or about its boiling point at atmospheric pressure to diffuse into solid masses of rubber. On the other hand, the crystalline reaction product of hydrogen halide and rubber is produced by passing gaseous hydrogen halides through a rubber solution at ordinary temperatures as described in various publications such as Bradley and McGavack Patent No. 1,519,659 and Calvert Patent No. 1,989,632.

Rubber hydrochloride made by the action of hydrogen chloride on rubber at low temperatures also differs from rubber hydrochloride made by other processes in that on substantial completion of the reaction with hydrogen chloride at low temperatures of, for example, —80° C., the reaction product has a chlorine content at a maximum of about 29.9% as compared with 31-32% on products made with the same purity of rubber by other methods. Whether this difference in chlorine content is due to a cyclization or polymerization of the rubber hydrochloride at low temperatures and whether the reaction product obtained with hydrogen chloride and rubber at low temperatures is a mixture of pure amorphous asymmetrical rubber hydrochloride with some other amorphous rubber derivatives is not definitely known. Due to the difficulty of describing the product it will be referred to in the specification as the reaction product of hydrogen chloride and rubber at low temperatures.

It is an object of the invention to provide compositions from the reaction product of halogen containing rubber derivative and alcohol adapted for the manufacture of lacquers, paints and protective coatings of all kinds, or which may be adapted for the production of molded articles, thin sheets and the like. Other objects will become apparent on reading the specification.

In carrying out the present invention, a halogen containing rubber derivative is treated with an aliphatic alcohol at elevated temperatures. In accordance with the temperature, the mass, and the time of treatment, reaction products are obtained ranging from soft to very hard material. The products through this range, and especially the products obtained with glycerin are all practically insoluble in acetone, ethyl acetate, and insoluble and merely swell in benzol, chloroform, carbon tetrachloride, ethylene dichloride. They thus differ greatly from the soluble reaction product of liquefied hydrochloride and rubber, which is one of the halogen containing rubber derivatives used in the reaction with alcohols. It is, therefore, a further and important object of this invention to obtain insoluble products from the soluble liquefied hydrochloride rubber reaction product. In general, however, the process may be carried out with all halogen containing rubber derivatives, such, for example, as chlorinated rubber, rubber hydrochlorides, chlorinated rubber hydrochlorides, hydrochlorinated rubber chlorides, rubber sulfur chloride, vulcanized rubber hydrochlorides and rubber chlorides, chlorinated and hydrochlorinated vulcanized rubber, mixtures of such compounds and, these compounds being completely or partially saturated with halogen or hydrohalogen. Alcohols such as glycerol, polyglycerols, glycols, are operable in this process.

The following examples are given below to illustrate in greater detail the above indicated processes: Since the mass has an effect on the nature of the product obtained in a given length of time the actual quantity is given in the examples for the particular time of treatment but it is to be understood that the mass may be varied greatly, in general the greater the mass the higher the internal heat and the shorter the time. Milled sheets rolled into fifty pound balls are satisfactory.

Example I

About 40 grams of a powdery milled mixture of 10 parts glycerol and 100 parts asymmetrical rubber hydrochloride are heated on a glycerine bath at 140° C. The material changes from a powdery mass to a sticky, rubbery material by successive stages. First resin formation is exhibited at the end of about six hours.

Example II 100 grams of a mixture of 10 parts glycerine and 100 parts asymmetrical rubber hydrochloride are thoroughly milled until a sheet is obtained. This product is rolled into a compact bundle and heated on a glycerine bath in a beaker at 140° F. Fifteen minutes after obtaining 140° C. on the bath the mass begins to swell and continues to do so for about an hour. At the end of an hour it begins to shrivel and fuse. As the heating progresses the material becomes more gummy and darker in color. At the end of thirty hours the product is not very brittle, but is rather tough and of gummy nature.

Example III 250 grams of a mixture of 15 parts glycerine and 100 parts asymmetrical rubber hydrochloride are thoroughly milled until a sheet is obtained. The product is rolled into a compact bundle and heated in gallon tin pails with perforated lids at 140° C.–160° C. for varying lengths of time. Brittle black resins may be obtained on four hours' treatment. Longer heat treatment up to twenty-four hours (at lower temperature) produces tougher, infusible products.

Example IV

Parts by weight
Asymmetrical rubber hydrochloride_____ 100
Triethylene glycol_____ 20

259 grams of the above mixture after milling into sheets is heated for 16 hours at 140° C. The percent loss in weight is 38.2. The mixture is very difficult to mill, taking almost two hours to add the triethylene glycol. After heating a black, very brittle, glossy, resin results. There is evidence of a high heat of reaction at some state of the process.

Example V

Parts by weight
Asymmetrical rubber hydrochloride_____ 100
Glycerine _____ 5

220 grams of the above mixture after milling into sheets is heated for 16 hours at 140° C. The percent loss in weight is 24.5. The mixture is dark brown, hard and tough after milling. There is obtained a black and dark brown resin, mostly of a tough rubbery character, but there is also some brittle resin formation, with glossy surface, and slightly sticky.

Example VI

Parts by weight
Asymmetrical rubber hydrochloride_____ 100
Glycerine _____ 10

242 grams of the above mixture after milling into sheets is heated for 16 hours at 140° C. The percent loss in weight is 29%. The mixture is dark brown, hard on cooling after milling. Black, glossy, very honeycombed in appearance, brittle resin is obtained. No tough intermediates are formed.

Example VII

Parts by weight
Asymmetrical rubber hydrochloride_____ 100
Glycerine _____ 20

252 grams of the above mixture after milling into sheets are heated for 16 hours at 140° C. The percent loss in weight is 40%. The mixture is light tan, very hard after milling. Black, brittle, fairly glossy, tough resin is obtained. There is no evidence of intermediate product formation.

Example VIII

Parts by weight
Asymmetrical rubber hydrochloride_____ 100
Triethylene glycol_____ 10

229 grams of the above mixture after milling into sheets is heated for 16 hours at 140° C. The percent loss in weights is 40.6%. The mixture is difficult to mill; dark brown in color. It completely fused on heating into a glossy, very brittle, jet black resin. There is complete conversion with no evidence of intermediate product formation.

Example IX

Parts by weight
Asymmetrical rubber hydrochloride_____ 100
Triethylene glycol_____ 5

243 grams of the above mixture after milling into sheets is heated for 16 hours at 140° C. The percent loss in weight is 44.8%. The mixture is difficult to mill; crumbles into small pieces, and is dark brown in color. After heating a black, very brittle, glossy resin results. There is no evidence of intermediate product formation, but evidence of a high heat of reaction.

Example X

Parts by weight
Asymmetrical rubber hydrochloride_____ 100
Glycerine _____ 15

265 grams of the above mixture after milling into sheets is heated for 4 hours at 140° C. The percent loss in weight is 40%. The reaction product is a black, fused, brittle, glossy resin. No balata like products are obtained.

Example XI

Parts by weight
Asymmetrical rubber hydrochloride_____ 100
Glycerine _____ 15

250 grams of the above mixture after milling into sheets is heated for 8 hours at 140° C. The percent loss in weight is 40%. The reaction product is a black, brittle, glossy resin. No intermediates are obtained. A completely fused product results.

Example XII

Parts by weight
Asymmetrical rubber hydrochloride_____ 100
Glycerine _____ 15

277 grams of the above mixture after milling into sheets is heated for 16 hours at 140° C. The percent loss in weight is 38.6%. The reaction product is fused having about one-half spongy, honeycombed material which is tougher than the fused product. Glossy surfaced, brittle, black resins in general are obtained by this treatment.

Example XIII

| | Parts by weight |
|---|---|
| Asymmetrical rubber hydrochloride | 100 |
| Glycerine | 1 |
| Phthalic anhydride | 4 |

252 grams of the above mixture after milling into sheets is heated for 16 hours at 140° C. The percent loss in weight is 40.5%. Glycerine and phthalic anhydride here is incorporated in the rubber in mol. proportions so as to form glyceryl phthalate on heating at 140° C. Black, glossy, brittle, resins completely fused are obtained.

Example XIV

| | Parts by weight |
|---|---|
| Asymmetrical rubber hydrochloride | 100 |
| Glycerine | 1 |
| Phthalic anhydride | 4 |
| Glycol-succinate | 3 |

265 grams of the above mixture after milling into sheets is heated for 16 hours at 140° C. The percent loss in weight is 46%. Glycerine and phthalic anhydride in this resin is modified with 60% glycol-succinate. Black-brown brittle resin, glossy surface, completely fused resin is obtained.

Example XV

| | Parts by weight |
|---|---|
| Asymmetrical rubber hydrochloride | 100 |
| Glycerine | 10 |

234 grams of the above mixture after milling into sheets is heated for 24 hours at 100° C. The percent loss in weight is 29.5%. Black, very flexible, tough glossy, fused resin is obtained. On milling there is produced elastic, insoluble transparent sheets.

Example XVI

| | Parts by weight |
|---|---|
| Asymmetrical rubber hydrochloride | 100 |
| Glycerine | 15 |

280 grams of the above mixture is milled into sheets and heated for 24 hours at 100° C. The percent loss in weight is 18%. The material is tough, flexible, black, fused, glossy resin. On milling and calendering the reaction product there is produced tough flexible transparent sheets.

Example XVII

| | Parts by weight |
|---|---|
| Asymmetrical rubber hydrochloride | 100 |
| Glycerine | 10 |

252 grams of the above mixture after milling is heated for 16 hours at 140° C. The percent loss in weight is 30.5%. The material is tough, flexible, balata like, not fused. The mixture was milled only until the glycerol was partially incorporated in the R—HCl. A powdery mass not sheeted was obtained which was then heated.

Example XVIII

| | Parts by weight |
|---|---|
| Asymmetrical rubber hydrochloride | 100 |
| Glycerine | 10 |

257 grams of the above mixture after milling into a powder is heated for 4 hours at 100° C. The percent loss in weight is 27.2%. Rubbery, spongy balata like mass is obtained. No fusion to brittle resin is found.

Example XIX

| | Parts by weight |
|---|---|
| Asymmetrical rubber hydrochloride | 100 |
| Glycerine | 10 |

245 grams of the above mixture after milling into sheets is heated for 8 hours at 140° C. The percent loss in weight is 34.7%. The resulting material is a black, mostly brittle, fused resin with a glossy surface. There is evidence of slight intermediate action or incomplete conversion. Some honeycombing results.

Example XX

| | Parts by weight |
|---|---|
| Asymmetrical rubber hydrochloride | 100 |
| Glycerine | 15 |

237 grams of the above mixture after milling into sheets is heated for 4 hours at 100° C. The percent loss in weight is 24%. The resulting material is powdery after milling. Rubbery, spongy balata like mass is obtained. There is incomplete conversion. No brittle resin but a gummy, black material is found.

Example XXI

| | Parts by weight |
|---|---|
| Asymmetrical rubber hydrochloride | 100 |
| Glycerine | 15 |

270 grams of the above mixture after milling into a powder is heated for 8 hours at 100° C. The percent loss in weight is 27.7%. The resulting material is fairly brittle, partially fused, brown on bottom, black on top; a partially balata like product.

Example XXII

| | Parts by weight |
|---|---|
| Asymmetrical rubber hydrochloride | 100 |
| Glycerine | 10 |

205 grams of the above mixture after milling into sheets is heated for 8 hours at 100° C. The percent loss in weight is 17%. The resulting material is balata like on bottom, only partially converted to balata. No fused or brittle resin is found.

Example XXIV

| | Parts by weight |
|---|---|
| Asymmetrical rubber hydrochloride | 100 |
| Propylene glycol $CH_3CHOHCH_2OH$ | 10 |

241 parts of the above mixture after milling into sheets is heated for 16 hours at 140° C. The percent loss in weight is 30%. The resulting material is a brittle, honeycombed, black mass, with dull finish. The material remains in one lump and is difficult to powder.

Example XXVI

| | Parts by weight |
|---|---|
| Asymmetrical rubber hydrochloride | 100 |
| Ethylene glycol $HOCH_2—CH_2OH$ | 10 |

237 parts of the above mixture after milling into sheets is heated for 16 hours at 140° C. The percent loss in weight is 45.5%. The resulting material is a very brittle, hard, glossy surfaced resin.

Example XXVII

| | Parts by weight |
|---|---|
| Asymmetrical rubber hydrochloride | 100 |
| Diethylene glycol $HOCH_2—CH_2—OCH_2CH_2OH$ | 10 |

230 grams of the above mixture after milling into sheets and heated for 16 hours at 140° C. The percent loss in weight is 34.8%. The resulting material is black, brittle, slightly honeycomed on surface resin.

Example XXXI

| | Parts by weight |
|---|---|
| Asymmetrical rubber hydrochloride | 100 |
| Triethylene glycol $(CH_2OCH_2CH_2OH)_2$ | 10 |

229 parts of the above mixture after milling into sheets is heated for 16 hours at 140° C. The percent loss in weight is 47.8%. The resulting material is glossy, completely fused, brittle resin, black in color.

Example XXXII

| | Parts by weight |
|---|---|
| Asymmetrical rubber hydrochloride | 100 |
| Glycerol CH₂OH—CH—OH—CH₂OH | 10 |

242 parts of the above mixture after milling into sheets is heated for 16 hours at 140° C. The percent loss in weight is 29%. The milled material is dark brown hard material. Black, glossy, very honeycombed in appearance, brittle resin is obtained.

Example XXXIII

| | Parts by weight |
|---|---|
| Symmetrical rubber hydrochloride | 100 |
| Gylcerol | 10 |

262 grams of the above mixture after milling into sheets is heated for 24 hours at 100° C. The percent loss in weight is about 18%. The resulting product is a resin of black and brittle surface and tough interior. The product is soluble in turpentine and otherwise less resistant than the asymmetrical material obtained under the same conditions.

Variations in the properties of the products of this application depend in general upon the time and temperature of the reaction and upon the kind of aliphatic alcohol employed, as well as upon the relative quantities of these ingredients used. The total mass of the mixture also has a great effect, and also whether the mixture is milled and the manner in which it is milled. The mass should be large enough so that the temperature produced by the reaction will raise the temperature of the mass to a high degree. Internal temperatures of around 400° C. may be attained by these exothermic reactions. With the product obtained by reacting liquefied hydrogen chloride and rubber it is of particular importance to mill the material into sheets, but milling of the symmetrical rubber hydrochloride is also advisable. The preferred commercial method for carrying out these reactions is to roll milled sheets into balls or bundles of about fifty pound mass and then heat externally to start the reaction which proceeds with the evolution of heat which is retained in the mass and aids in the formation of the new resins. Another method is to stack the sheets in trays to a thickness of about six inches.

It is to be understood that variations in the described methods may be made and that the invention is not limited to the exact proportions, temperatures, and time of reaction given in the example, but such are but illustrations of the principles of the invention.

I claim:

1. A composition comprising the reaction product of a chlorine containing rubber derivative and glycerine.

2. A composition comprising the reaction product of a rubber hydrochloride and gylcerine.

3. A composition comprising the reaction product of glycerine and the product obtained by the reaction of liquefied hydrogen chloride and rubber.

4. A composition comprising the reaction product of glycerine and asymmetrical rubber hydrochloride.

5. A composition comprising the reaction product of a glycol and a halogen containing rubber derivative.

6. The method which comprises heating a chlorine containing rubber derivative with glycerine until a part of the chlorine has been eliminated.

7. The method which comprises reacting a rubber hydrochloride with glycerine.

8. The method which comprises reacting a halogen containing rubber derivative with a glycol.

9. The method which comprises heating an asymmetrical rubber hydrochloride with glycerine until a resin is produced.

10. The method which comprises heating an asymmetrical rubber hydrochloride with a glycol until a resin is produced.

11. The method which comprises heating an asymmetrical rubber hydrochloride with glycerine until a product is obtained which is less soluble in turpentine than is said rubber hydrochloride.

12. A composition comprising the reaction product of a halogen containing rubber derivative and an alcohol selected from the group consisting of the glycerols and glycols.

13. A composition of matter comprising the reaction product of a rubber hydrohalide and an alcohol from the group consisting of the glycerols and glycols.

14. A composition of matter comprising in intimate admixture a rubber hydrohalide and an alcohol from the group consisting of glycerols and glycols.

15. The method which comprises heating a rubber hydrohalide with an alcohol from the group consisting of the glycerols and glycols until a resin is produced.

HERBERT A. WINKELMANN.